United States Patent
Chang et al.

(10) Patent No.: US 7,221,318 B2
(45) Date of Patent: May 22, 2007

(54) SYSTEM AND METHOD FOR CONTROLLING ANTENNA PATTERN

(75) Inventors: Henry Chang, San Diego, CA (US); Doug Dunn, Chula Vista, CA (US)

(73) Assignee: Kyocera Wireless Corp., San Diego, CA (US)

( * ) Notice: Subject to any disclaimer, the term of this patent is extended or adjusted under 35 U.S.C. 154(b) by 0 days.

(21) Appl. No.: 11/225,931

(22) Filed: Sep. 13, 2005

(65) Prior Publication Data

US 2007/0057843 A1    Mar. 15, 2007

(51) Int. Cl.
*H01Q 3/00*    (2006.01)
(52) U.S. Cl. .................................. 342/372; 342/373
(58) Field of Classification Search ............ 342/368, 342/372, 373, 374; 455/277.1, 277.2
See application file for complete search history.

(56) References Cited

U.S. PATENT DOCUMENTS

| 4,050,071 | A | * | 9/1977 | Clorfeine | 342/117 |
| 4,134,113 | A | * | 1/1979 | Powell | 342/25 C |
| 5,175,551 | A | * | 12/1992 | Rubin | 342/26 D |
| 6,512,481 | B1 | | 1/2003 | Velazquez et al. | |
| 6,529,161 | B2 | * | 3/2003 | Fukushima et al. | 342/359 |
| 6,529,745 | B1 | * | 3/2003 | Fukagawa et al. | 455/562.1 |
| 6,593,880 | B2 | | 7/2003 | Velazquez et al. | |
| 6,750,810 | B2 | * | 6/2004 | Shinoda et al. | 342/149 |
| 6,750,813 | B2 | | 6/2004 | Vargas-Hurlston et al. | |
| 7,117,014 | B1 | * | 10/2006 | Van Rensburg et al. | 455/561 |
| 2003/0164791 | A1 | | 9/2003 | Shinoda | |
| 2004/0082311 | A1 | | 4/2004 | Shiu | |
| 2005/0255892 | A1 | * | 11/2005 | Wong et al. | 455/562.1 |

FOREIGN PATENT DOCUMENTS

GB    2271486    4/1994

OTHER PUBLICATIONS

International Search Report (ISR): PCT/ISA/220, 210 for International Application No. PCT/US2006/034871, ISR dated Jan. 24, 2007, 6 pages.

* cited by examiner

*Primary Examiner*—Dao Linda Phan

(57) ABSTRACT

A communication system and method for controlling an antenna pattern is disclosed. The communication system may be situated on a mobile station, a base station, or a combination thereof. The communication system comprises a smart antenna module, a speed sensor, and a beam steering module. The smart antenna module may be situated on the mobile station, the base station, or a combination thereof. The smart antenna module generates at least one initial antenna pattern. The speed sensor is configured to determine a speed of a mobile station. The beam steering module generates an operating antenna pattern that is different from the initial antenna pattern. The operating antenna pattern is affected by changes in the speed of the mobile station.

24 Claims, 5 Drawing Sheets

SYSTEM AND METHOD FOR CONTROLLING ANTENNA PATTERN

FIELD OF THE INVENTION

This invention relates to an apparatus and method for controlling antenna pattern. More particularly, the invention relates to control of the antenna pattern as a function of the speed of a mobile station.

BACKGROUND OF THE INVENTION

In mobile communication systems, capacity and performance are usually limited by multipath and co-channel interference. Multipath is a condition which arises when a transmitted signal undergoes reflection from various obstacles in the propagation environment. The multipath signals follow different paths and have different phases when they are arrive at the receiver. The result is degradation in signal quality when they are combined at the receiver due to the phase mismatch.

Smart antennas enable a higher capacity in wireless networks by effectively reducing multipath and co-channel interference. Smart antennas focus the radiation in the preferred direction and adjusts itself to changing traffic conditions or signal environments. The signals from these elements are combined to form a movable or switchable beam pattern. The process of combining the signals and then focusing the radiation in a particular direction is often referred to as digital beamforming.

By way of example and not of limitation, there are two types of smart antennas that dynamically change their antenna pattern to mitigate interference and multipath effects while increasing coverage and range, namely, switched beam and adaptive arrays. The switched beam smart antenna system provides an increase in network capacity with an antenna array that generates beams that cover specific areas. For an illustrative base station, the base station determines the beam that is best aligned in the signal-of-interest direction and then switches to that beam to communicate with the mobile station.

By way of example and not of limitation, the adaptive array smart antenna system tracks the mobile user continuously by steering the main beam towards the mobile station and at the same time forming nulls in the directions of the interfering signal. In the illustrative example, the signal received from each of the spatially distributed antenna elements is multiplied by a weight. The weights are complex in nature and adjust the amplitude and phase. These signals are combined to yield the array output. These complex weights are computed by an adaptive algorithm.

There are a variety of benefits to the use of smart antennas which include the reduction of co-channel interference, range improvement, increase in capacity, reduction in transmitted power, mitigation of multi-path effects and compatibility with TDMA, FDMA and CDMA systems.

However, there are a number of limitations to smart antennas. These include performance degradation when the mobile station is in motion. More particularly, at driving speeds and pedestrian speeds, performance degradation is caused by inadequate beam steering. Beam steering is the changing of the direction of the main lobe of a radiation pattern. In radio systems, beam steering may be accomplished by switching antenna elements or by changing the relative phases of the RF signals.

Performance degradation is caused by the smart antenna's limitations. The smart antenna's beam steering is too focused, and does not easily accommodate movement of the mobile station. As a result the mobile station may drop calls. Solutions such as increasing processor speed fail to solve these smart antenna limitations because the problem revolves around measurements needed to collect the data required for beam steering. The measurements that might be performed for beam steering include power levels, signal to noise ratios, power control and other such measurements that are performed during the beam steering process. Each of these measurements must be made over a period of time to provide sufficient accuracy. However, when the mobile station is in motion, the time needed to make these measurements with the required accuracy is not available. The resulting measurement data is less accurate or is incomplete resulting in performance degradation of the smart antenna. Thus, when the mobile station is moving faster than the rate at which the smart antenna measurements can be completed, performance is degraded.

SUMMARY OF THE INVENTION

A communication system and method for controlling an antenna pattern. The communication system may be situated on a mobile station, a base station, or a combination thereof. In one embodiment, the communication system comprises a smart antenna module, a speed sensor, and a beam steering module. In an alternative embodiment, a means for determining the speed of the mobile station is employed. The smart antenna module may be situated on the mobile station, the base station, or a combination thereof. The smart antenna module generates at least one initial antenna pattern. The speed sensor is configured to determine the speed of a mobile station. The beam steering module is communicably coupled to the speed sensor and generates an operating antenna pattern based on the speed of the mobile station. The operating antenna pattern is different from the initial antenna pattern. Thus, the operating antenna pattern is affected by changes in the speed of the mobile station.

Typically, the operating antenna pattern is broader than the initial antenna pattern when the mobile station exceeds a particular speed. By way of example and not of limitation, the operating antenna pattern coverage increases due to increasing speed of the mobile station, and the operating antenna pattern coverage decreases due to decreasing speed of the mobile station. For example, when the mobile station is at a driving speed, the operating antenna pattern may be omni-directional. The communication system may be situated on the mobile station, the base station, or a combination thereof. Additionally, the communication system may be embodied in an integrated circuit, a processor, or a combination of such devices.

BRIEF DESCRIPTION OF THE DRAWINGS

The present invention will be more fully understood by reference to the following drawings which are for illustrative, not limiting, purposes.

DETAILED DESCRIPTION OF THE PREFERRED EMBODIMENTS

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems described hereinafter may vary as to configuration and as to details. Additionally, the method may vary as to details, order of the actions, or other variations without departing from the illustrative method disclosed herein.

Figure 1:
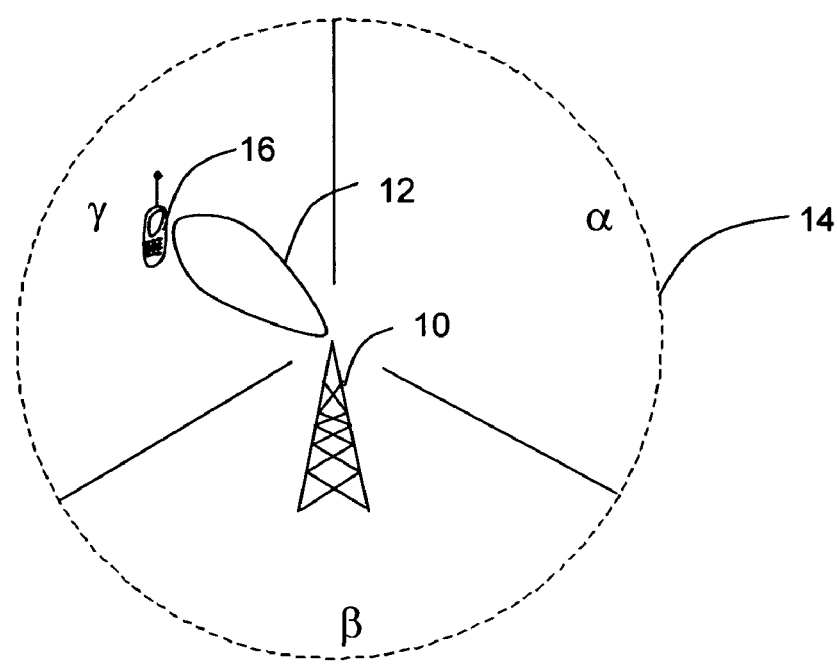
FIG. 1 shows an illustrative diagram of a base station having a smart antenna that is in communication with a mobile station.

Referring to FIG. 1 there is shown an illustrative diagram of a base station having a smart antenna module that generates an initial antenna pattern. The illustrative base station 10 has a smart antenna module (not shown) that generates an illustrative initial antenna pattern 12. This illustrative initial antenna pattern 12 is related to base station transmission, base station reception, or a combination thereof. The illustrative base station 10 is divided into three sectors: alpha (α), beta (β) and gamma (γ). By way of example and not of limitation, each base station sector includes antennas that may be capable of transmitting and receiving a beamwidth of approximately 120°. The boundaries of the base station 10 are identified by circle 14. The circle 14 is used to show an illustrative radiation pattern.

The illustrative base station 10 comprises a smart antenna module. By way of example and not of limitation, the smart antenna module for base station 10 operations may be obtained from Arraycomm, Inc. located in San Jose, Calif. In the illustrative example, the smart antenna module situated on the base station 10 uses a small array of off-the shelf antennas coupled with sophisticated signal processing techniques to dynamically control radio signals between the base station and the illustrative mobile station 16. The signal processing, which occurs at the base station, selectively amplifies each mobile station's intended signal and rejects all unwanted signals, allowing greater numbers of mobile stations to share the spectrum. The result is a significant increase in capacity and coverage. Note, that conventional base stations (that do not include smart antenna modules) transmit energy in all directions so that only a small fraction of the signal reaches the intended mobile station, and the remaining RF energy is wasted and generates noise that interferes with other users in the system.

Figure 2:
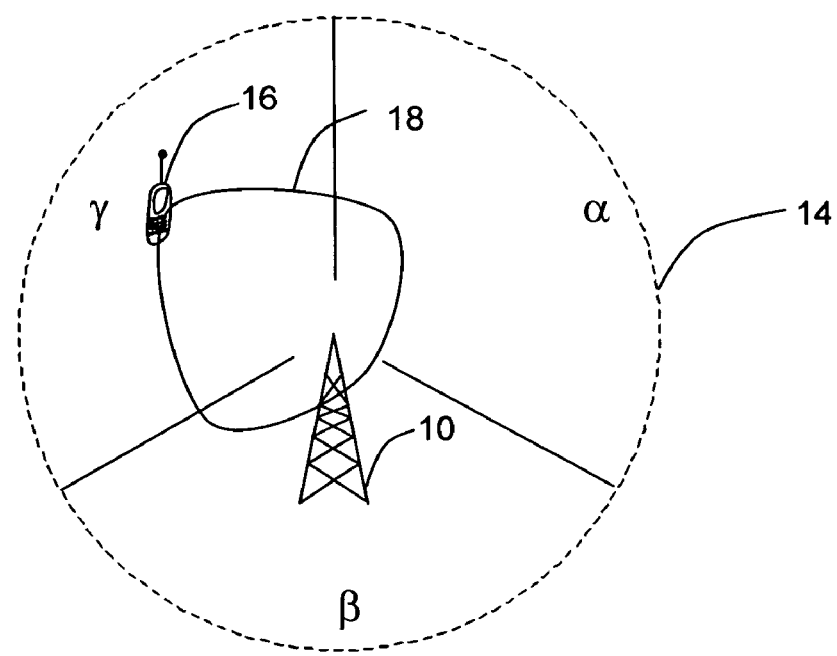
FIG. 2 shows an illustrative diagram of a mobile station having a smart antenna that is in communication with the base station.

Referring to FIG. 2 there is shown an illustrative diagram of the illustrative mobile station 16 having a smart antenna module that is in communication with the base station 10. The illustrative smart antenna module (not shown) is situated on the mobile station 10 and works in a manner that is consistent with the smart antenna module, which is described above. By way of example and not of limitation, the mobile station 16 generates an initial antenna pattern 18. This initial antenna pattern 18 is related to mobile station transmission, mobile station reception, or a combination thereof. Additionally, the smart antenna module may be modified in a manner consistent with U.S. application Ser. No. 11/111,643, filed Apr. 21, 2005, having the same named inventors identified herein.

Figure 3:
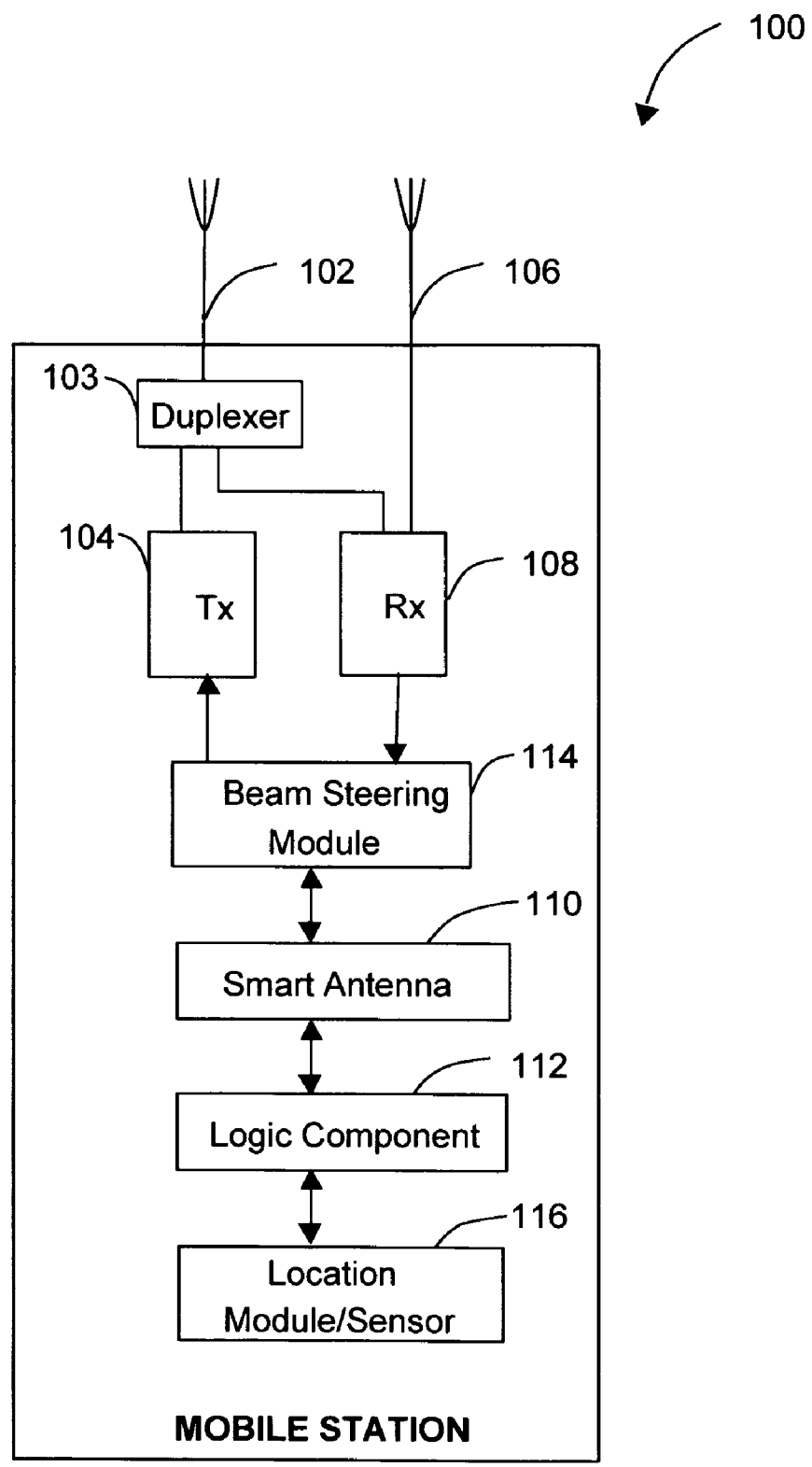
FIG. 3 shows an illustrative mobile station having a smart antenna and beam steering module.

Referring to FIG. 3 there is shown an illustrative mobile station 100 having a smart antenna module and beam steering module. Additionally, a location module and/or a location sensor 116 are shown. The illustrative first antenna element 102 is operatively coupled to a duplexer 103, which is operatively coupled to transmitter 104 and receiver 108. The illustrative second antenna element 106 is operatively coupled to a receiver 108. An illustrative smart antenna module 110 and logic component 112 are communicatively coupled to the transmitter 104 and receiver 108, via a beamforming module 114. An illustrative means for determining the speed of the mobile station is also shown and referred to as a location module and/or location sensor 116. Furthermore, the combination of a location sensor and location module having a timing element may function as a speed sensor. Further still, an illustrative sensor may detect Doppler shift and calculate speed based from the Doppler shift. Additionally, those skilled in the art shall appreciate that a velocity sensor may also be used, or a means for detecting velocity may also be used to determine the speed of the mobile station.

By way of example and not of limitation, the location module and/or location sensor 116 is a GPS receiver, a sensor, or any other such device situated on the mobile station that provides data used to determine the speed of the mobile station 100. In one embodiment, the GPS receiver is situated on the mobile station and is configured to identify the location for the mobile station. The mobile station's logic component 112 is in communication with the GPS receiver and is configured to determine the speed for the mobile station.

Those skilled in the art having the benefit of this disclosure shall appreciate that the logic controller (not shown) of the smart antenna module 110 may perform separate operations that are different from the mobile station logic controller 112. By way of example and not of limitation, the mobile station logic controller 112 may be configured to perform the speed calculation and this calculation may be fed into the smart antenna module 110. In an alternative example, the mobile station logic controller 112 feeds location data to the smart antenna logic controller (not shown), and the smart antenna module logic controller calculates the speed of the mobile station. Similar embodiments shall be readily apparent to those skilled in the art having the benefit of the present disclosure.

In another embodiment, the means for determining speed is a location sensor 116 such as a speed sensor, velocity sensor, a sensor that detects Doppler shift, or an accelerometer or any other such sensor that can be used to determine the speed of the mobile station. By way of example and not of limitation, the velocity sensors may be rotary, angular, or linear velocity sensors.

Alternatively, the means for determining speed may comprise one or more networked devices in communication with the mobile station. For example, in some time division duplex (TDD) technologies, the networked devices may provide sufficient information to determine the speed of the mobile station. The networked devices may be base stations, other mobile stations, or other network device configured to determine speed, or any combination thereof. The networked devices may use well-known triangulation methods to determine the speed of the particular mobile station 100.

The receiver 108 is configured to receive a plurality of RF signals that are communicated by one or more base station transmitters. The RF signals are communicated by a serving base station 10 to the mobile station 100. The illustrative smart antenna module 110 acts like it is steering or beam forming from one antenna configuration to another. The digital signal processing associated with the smart antenna module 110, permits the smart antenna to process a plurality of different antenna configurations at the same time. The logic component 112 comprises one or more digital signal processors (DSPs).

The illustrative smart antenna module 110 applies complex weights to the signals going to or coming from the antenna elements resulting in generating at least one initial antenna pattern, which may also be as an effective radiation pattern. In the illustrative embodiment, the smart antenna module 110 generates an initial antenna pattern. By way of example and not of limitation, the smart antenna module 110 is configured to generate at least one initial antenna pattern. The beam steering module 114 is configured to change the initial antenna pattern as a function of the speed of the mobile station, which is referred to as an operating antenna pattern. Thus, the operating antenna pattern is similar to the initial antenna pattern described above, except the operating antenna pattern is affected by changes in speed of the mobile station.

For illustrative purposes only, the beam steering module 114 is shown as a separate element or module in FIG. 3. For the illustrative example provided in FIG. 3, those skilled in the art shall appreciate that the beam steering module 114 comprises a look-up table that maps specific speeds or velocities to specific operating antenna patterns. Alternatively, it shall be appreciated by those of ordinary skill in the art that the beam steering module may reside in logic component 112 due to the desirability of using digital signal processing to program the beam steering of the antenna.

The beam steering module 114 is configured to generate an operating antenna pattern that is different from the initial antenna pattern generated by the smart antenna module 110. The operating antenna pattern is affected by changes in the speed of the mobile station. By way of example and not of limitation, the software and hardware tools for developing the beam steering module 114, the smart antenna module 112, and the logic component 112 may be provided by companies such as Magnolia Broadband, Inc. headquartered in Bedminster, N.J., Interdigital Communications, Corp. headquartered in King of Prussia, Pa., Qualcomm Inc. headquartered in San Diego, Calif., or Arraycomm headquartered in San Jose, Calif.

In operation, the operating antenna pattern is broader than the initial antenna pattern when the mobile station exceeds a particular speed. For example, the operating antenna pattern coverage increases due to increasing speed of the mobile station. Additionally, the operating pattern coverage decreases due to decreasing speed of the mobile station. Furthermore, there may be mobile station speed where the operating antenna pattern cannot be increased or decreased because of operating limitations.

By way of example and not of limitation, when the mobile station is moving at a speed above a high speed threshold the operating antenna pattern may be an omni-directional antenna pattern 360°. Those skilled in the art shall appreciate that the high speed threshold depends on, inter alia, the network design, communication protocols and standards, and the design of the particular mobile station. In a relatively broad illustrative example, the high speed threshold exceeds 20 mph. In a narrowing embodiment, the high speed threshold exceeds 30 mph. In a more narrowing embodiment, the high speed threshold exceeds 40 mph. In an even more narrowing embodiment, the high speed threshold exceeds 50 mph.

In another illustrative example, the operating antenna pattern for a mobile station traveling at a driving speed that exceeds 20 miles per hour is broader than the initial antenna pattern for a stationary mobile station. In yet another illustrative example, the operating antenna pattern for a mobile station at a driving speed that exceeds 40 miles per hour is broader than the operating antenna pattern for a mobile station having a speed of 20 miles per hour. In still another illustrative example, the operating antenna pattern for a mobile station that exceeds 50 miles per hour may be an omni-directional antenna pattern. It shall be appreciated by those of ordinary skill in the art having the benefit of this disclosure, that the illustrative examples and embodiments are intended to clarify the operating antenna pattern at different driving speeds.

Figure 4:
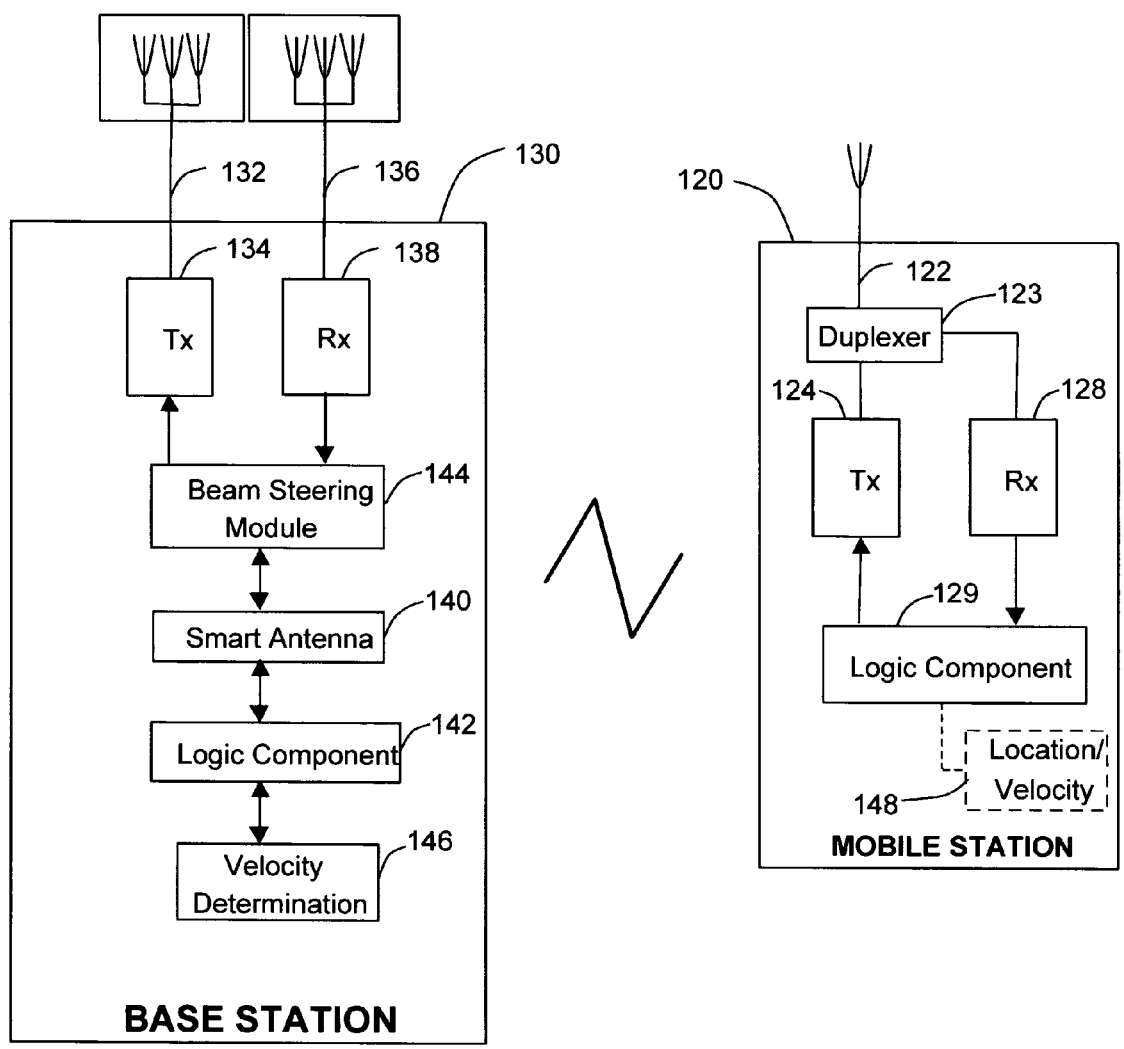
FIG. 4 shows an illustrative base station having a smart antenna and beam steering module in communication with a mobile station.

Referring to FIG. 4 there is shown an illustrative base station having a smart antenna module and beam steering module in communication with a mobile station. In this illustrative embodiment, the mobile station 120 has been simplified and comprises a first antenna element 122 coupled to a duplexer 123, which is in operative communication with transmitter 124 and receiver 128. The transmitter 124 and receiver 128 are operatively coupled to a logic component 129. In this illustrative embodiment, the smart antenna module is situated in the illustrative base station 130.

The illustrative base station 130 is configured to communicate with the mobile station 120. The illustrative base station 130 comprises a plurality of first smart antenna elements 132, which are operatively coupled to a transmitter 134. A plurality of second smart antenna elements 136 are operatively coupled to a receiver 138. An illustrative smart antenna module 140 and logic component 142 are communicatively coupled to the transmitter 134 and receiver 138, via a beam steering module 144. A means for determining the speed of the mobile station is also shown and referred to as a speed sensor 146. It shall be appreciated by those skilled in the art that the illustrative base station 130 describes a digital signal processing embodiment. In an alternative true beam steering embodiment, those skilled in the art shall appreciate that connections are needed between the smart antenna module 140 and the plurality of smart antenna elements 132 and 136.

In the illustrative base station 130 embodiment, the means for determining the speed of mobile station is situated on the base station. In this illustrative embodiment, the base station 130 determines the speed of the mobile station by tracking the speed of the illustrative mobile station 120. For example if GPS is used, the base station 130 may initiate a position determination session so that the mobile station 120 would either return the pseudo-range data or latitude/longitude data to the base station. In another illustrative example, the base station 130 in conjunction with other base stations (not shown) may measure the Doppler shift from the mobile station 120. In yet another example, triangulation methods may be used to identify the location of the mobile station and any changes in the location can be associated with changes in speed. In still another example, spatial channel information collected during Spatial Division Multiple Access (SDMA) communications may be used to identify the location of the illustrative mobile station 120. By analyzing the spatial channel information as a function of time, a speed may then be calculated.

For another set of base station embodiments, the means for determining the speed of the mobile station is situated on both the base station 130 and mobile station 120. For example, the location module and/or location sensor 148 is a GPS receiver, a sensor, or any other such device that is situated on the mobile station. The location module and/or location sensor provides data that is communicated to the base station and is then used by the base station to determine the speed of the mobile station 100. In another example, the means for determining speed is a location sensor 116 such as a velocity sensor, or an accelerometer or any other such speed sensor that can be used to determine the speed of the mobile station. In this embodiment, the speed information collected by the mobile station 120 is then communicated to the base station. In yet another example, the position determination entity is a device located in the network, but not located at the base station 130. A variety of other embodiments that permit determining the speed of the mobile station will readily suggest themselves to those of ordinary skill in the art having the benefit of this disclosure.

Once the speed of the mobile station 120 has been determined by the base station, the base station proceeds to use this information to determine an operating antenna pattern. The operating antenna pattern is the antenna pattern that is used by the base station in transmit mode, receive mode, or a combination thereof. By way of example, the smart antennal module 140 located on the base station 130 is configured to generate at least one initial antenna pattern, and the beam steering module 144 is configured to change the initial antenna pattern to an operating antenna pattern. The operating antenna pattern is affected by changes in speed of the mobile station.

As previously discussed, the operating antenna pattern is broader than the initial antenna pattern when the mobile station is in motion. In operation, the operating antenna pattern increases when the speed of the mobile station increases. Additionally, the operating antenna pattern decreases when the speed of the mobile station decreases. When the mobile station is moving at a high rate of speed, such as a driving speed, the operating antenna pattern generated by the base station 130 may be omni-directional. By way of example and not of limitation, above a mobile station's particular high speed threshold, the beam steering module 144 situated in the base station 130 may be transmitting in an omni-directional mode.

Figure 5:
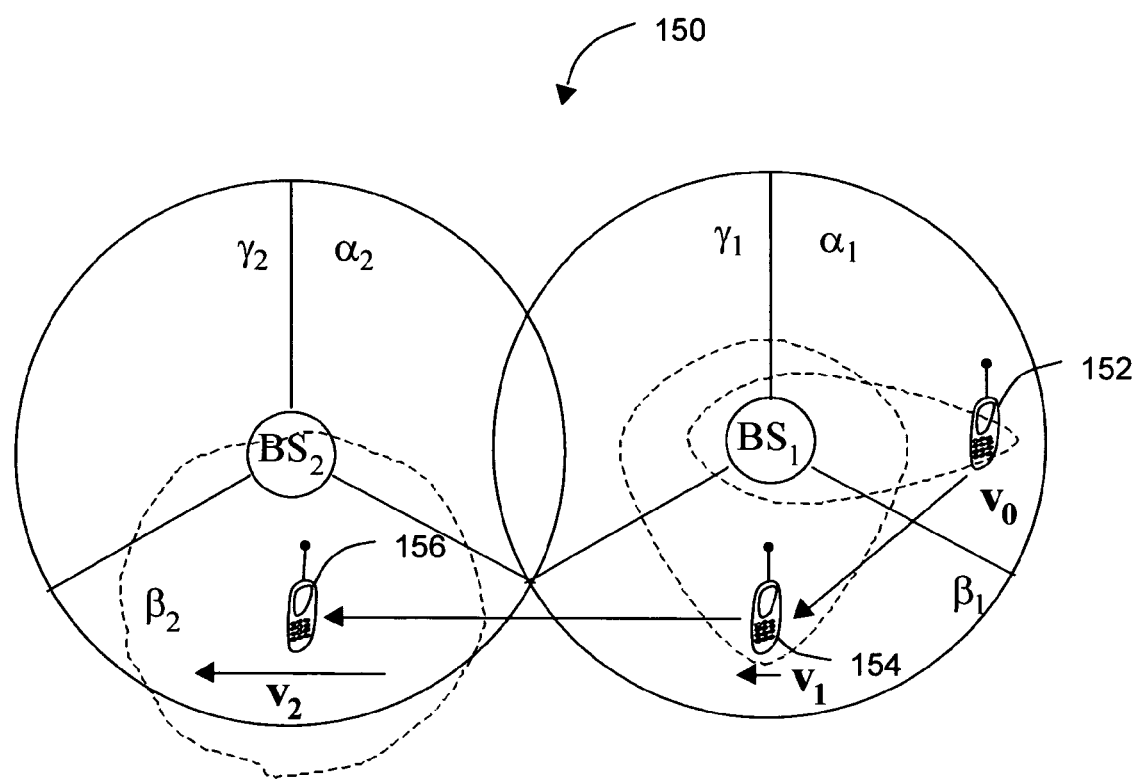
FIG. 5 shows an illustrative diagram of a mobile station traveling at different speeds and the resulting antenna beamwidth generated by the mobile station.

Referring to FIG. 5 there is shown an illustrative diagram of the operating antenna pattern generated by a mobile station that is traveling at different speeds. In the illustrative embodiment, the operating antenna pattern is being controlled by the mobile station. Although not shown in FIG. 5, those skilled in the art shall appreciate that the base station may also be configured to control a base station operating antenna pattern in a manner similar to the illustrative mobile station.

In the illustrative embodiment, the mobile station in a first position 152 is stationary and the operating antenna pattern equals the initial antenna pattern associated with the smart antenna module 110 in FIG. 3. The initial antenna pattern is identified by the dotted lines emanating from the mobile station in position 152. When the mobile station is in a second position 154, the mobile station is in motion and has a "pedestrian" speed associated with it. At position 154, the operating antenna pattern increases due to the change in speed on the mobile station. By way of example and not of limitation, a pedestrian speed is approximately 3 miles per hour.

As previously described, the illustrative smart antenna's initial antenna pattern is too focused. Solutions such as increasing processor speed fails to solve these smart antenna limitations because the problem revolves around measurements used to control beam steering. These measurements include power levels, signal to noise ratios, power control and other such measurements that are performed during the beam steering process. Each of these measurements must be collected over a period of time and must provide sufficient accuracy to overcome the smart antenna limitations. Not having the time needed to achieve the required measurement accuracy results in performance degradation when the mobile station is moving and the pattern cannot be modified as quickly or as needed.

The mobile station increases the operating antenna pattern and overcomes the limitations associated with the smart antenna's initial antenna pattern. By increasing the operating antenna pattern in position 154, less information needs to collected and less measurement accuracy is required for communications. Additionally, the beam steering operations do not have to be as precise, because the operating antenna pattern is broader. Thus, by increasing operating antenna pattern, the illustrative mobile station overcomes the limitation of a focused smart antenna beam pattern.

In a third position 156, the mobile station has a relatively high speed. By way of example and not of limitation, the high speed exceeds a high speed threshold, e.g. 50 miles per hour. At this illustrative high speed, the illustrative operating antenna pattern is omni-directional. By providing an omni-directional antenna pattern the mobile station is not subject to any of the smart antenna's beam steering limitations. The mobile station having a beam steering module can overcome the limitations associated with smart antenna solutions, which generates a focused antenna pattern that can degrade performance when the mobile station is in motion.

Figure 6:
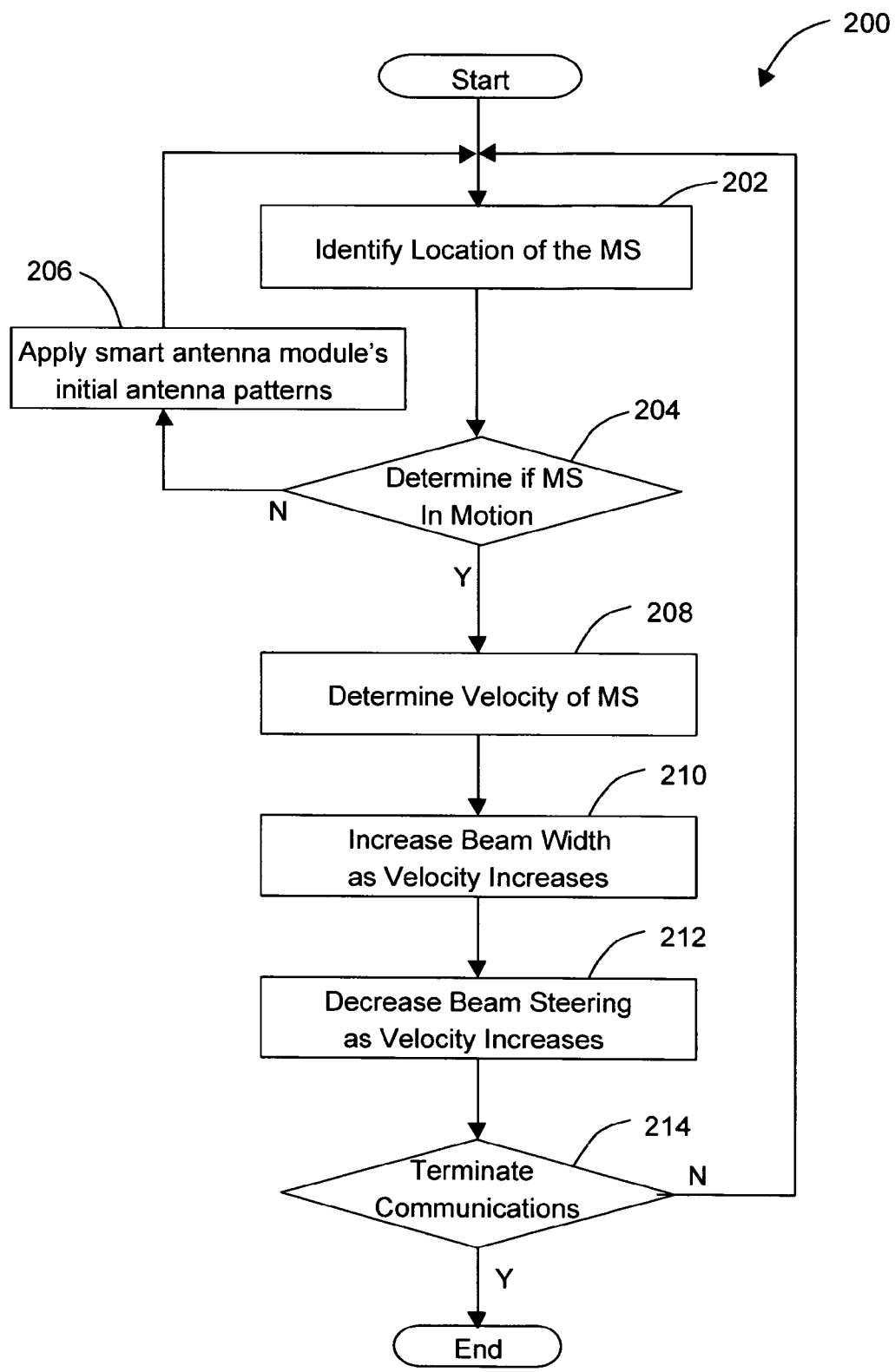
FIG. 6 shows an illustrative flowchart for controlling antenna beamwidth due to changes in speed of the mobile station.

Referring to FIG. 6 there is shown an illustrative flowchart for controlling an antenna pattern due to changes in speed of the mobile station. The flowchart 200 can be applied to a mobile station having a smart antenna, a base station having a smart antenna, or a combination thereof. As described above, the smart antenna module disposed on either a base station or mobile station has a predetermined initial antenna pattern.

The illustrative flowchart is initiated at block 202, where the location of the mobile station is identified. Those skilled in the art shall appreciate that this step is not necessary if a speed measurement can be made with a speed sensor, e.g. accelerometer. Thus, if the mobile station or the base station is configured to collect only speed data, then this process may be skipped. However, if the mobile station has a GPS receiver situated thereon, the GPS receiver will proceed to identify the location of the mobile station as a function of time.

At decision diamond 204, an illustrative binary determination of whether the mobile station is in motion is made. By way of example and not of limitation, the determination of whether the mobile station is in motion is made by identifying changes in location as a function of time, identifying a speed, identifying a velocity, or identifying mobile station acceleration or any combination thereof. If there is no motion associated with the mobile station, then the method proceeds to block 206 where the initial antenna pattern associated with the smart antenna module described above is used. The initial antenna pattern is a product of the mobile station smart antenna module 110 in FIG. 3 and/or the base station smart antenna module 140 in FIG. 4. By way of example and not of limitation, the initial antenna pattern is generated by using switched beam systems or adaptive array systems, or other such smart antenna systems.

If the determination is made that the mobile station is in motion at decision diamond 204, the method proceeds to block 208. At block 208, the speed of the mobile station is determined by the illustrative speed sensor described above. The speed information is used to determine the operating antenna pattern. Generally, the operating pattern is broader than the smart antenna module's initial antenna pattern when the mobile station is in motion. This result is reflected by blocks 210 and 212.

At block 210, the operating antenna pattern is increased when the speed of the mobile station increases. At block 212, the operating antenna pattern decreases if the speed of the mobile station decreases. The process of changing the operating antenna pattern as function of the speed of the mobile station is repeated until communications are terminated, as described in decision diamond 214.

By increasing the operating antenna pattern as a function of the speed of the mobile station, the limitations with the smart antenna's focused beam steering are overcome. The embodiments and examples described above may be applied to a mobile station, base station, or any combination thereof. A plurality of means for determining the speed of the mobile station have been described.

It is to be understood that the foregoing is a detailed description of illustrative embodiments. The scope of the claims is not limited to these specific embodiments or examples. Various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A communication system for controlling an antenna pattern of a mobile station antenna, the system comprising:
   a smart antenna module configured to generate at least one initial antenna pattern for said mobile station antenna;
   a speed sensor for measuring a speed associated with a mobile station;
   a beam steering module communicably coupled to said speed sensor, the beam steering module configured to generate an operating antenna pattern for said mobile station antenna based on said speed of said mobile station, said operating antenna pattern being different from said initial antenna pattern, said operating antenna pattering being broader than said initial antenna pattern when said mobile station exceeds a particular speed.

2. The communication system of claim 1 wherein said operating antenna pattern coverage increases due to increasing speed of said mobile station, and said operating antenna pattern coverage decreases due to decreasing speed of said mobile station.

3. The communication system of claim 2 wherein said operating antenna pattern is omni-directional when said speed of said mobile station exceeds a high speed threshold.

4. The communication system of claim 2 wherein said communication system is situated on a mobile station.

5. The communication system of claim 2, wherein said communication system is situated on a base station.

6. The communication system of claim 2, wherein said communication system is embodied in an integrated circuit.

7. The communication system of claim 2, wherein said communication system is embodied in a processor.

8. A mobile station configured to control an antenna pattern of a mobile station, comprising:
   a smart antenna module situated on said mobile station, said smart antenna module configured to generate at least one initial antenna pattern for said mobile station;
   a means for determining speed of said mobile station, said speed communicated to said mobile station;
   a beam steering module situated on said mobile station, said beam steering module communicably coupled to said means for determining speed, the beam steering module configured to generate an operating antenna pattern for said mobile station antenna based on said speed of said mobile station, said operating antenna pattern being different from said initial antenna pattern, said operating antenna pattern being broader than said initial antenna pattern when said mobile station exceeds a particular speed.

9. The mobile station of claim 8 wherein said operating antenna pattern coverage increases due to increasing speed of said mobile station, and said operating antenna pattern coverage decreases due to decreasing speed of said mobile station.

10. The mobile station of claim 9 wherein said operating antenna pattern is omni-directional when said speed of said mobile station exceeds a high speed threshold.

11. The mobile station of claim 9 wherein said means for determining speed comprises a GPS receiver situated on said mobile station, said GPS receiver configured to identify a location for said mobile station.

12. The mobile station of claim 11 further comprising a logic component in communication with said GPS receiver, said logic component configured to determine said speed for said mobile station.

13. The mobile station of claim 9 wherein said means for determining speed comprises one or more networked devices in communication with said mobile station, said networked device configured to provide sufficient information to determine said speed of said mobile station.

14. The mobile station of claim 9 wherein said means for determining speed comprises at least one sensor configured to determine said speed of said mobile station.

15. A base station configured to communicate with a mobile station wherein said base station is configured to control an antenna pattern of a base station antenna, said base station comprising:
   a smart antenna module situated on said base station, said smart antenna module configured to generate at least one initial antenna pattern for said base station antenna;
   a means for determining speed of said mobile station, said speed of said mobile station communicated to said base station;
   a beam steering module situated on said base station, said beam steering module communicably coupled to said means for determining speed, the beam steering module configured to generate an operating antenna pattern for said base station based on said speed of said mobile station, said operating antenna pattern being different from said initial antenna pattern, said operating antenna pattern being broader than said initial antenna pattern when said mobile station exceeds a particular speed.

16. The base station of claim 15 wherein said operating antenna pattern coverage increases due to increasing speed of said mobile station, and said operating antenna pattern coverage decreases due to decreasing speed of said mobile station.

17. The base station of claim 16 wherein said operating antenna pattern is omni-directional when said speed of said mobile station exceeds a high speed threshold.

18. The base station of claim 16 wherein said means for determining speed comprises a GPS receiver situated on said mobile station, said GPS receiver configured to identify a location for said mobile station.

19. The base station of claim 18 further comprising a logic component in communication with said GPS receiver, said logic component configured to determine said speed for said mobile station.

20. The base station of claim 16 wherein said means for determining speed of said mobile station further comprises one or more networked devices in communication with said base station, said networked device configured to provide sufficient information to determine said speed of said mobile station.

21. The base station of claim 16 wherein said means for determining speed comprises at least one sensor configured to determine said speed of said mobile station.

22. A method for conducting communications between a base station and a mobile station, comprising:
    providing a smart antenna module situated on said mobile station configured to generate at least one initial antenna pattern for a mobile station antenna;
    determining a speed for said mobile station;
    generating an operating antenna pattern for said mobile station antenna based on said speed of said mobile station, said operating antenna pattern being different from said initial antenna pattern; and
    generating an operating antenna pattern that is broader than said initial antenna pattern when said mobile station exceeds a particular speed.

23. The method of claim 22 wherein said operating antenna pattern coverage increases due to increasing speed of said mobile station, and said operating antenna pattern coverage decreases due to decreasing speed of said mobile station.

24. The method of claim 23 wherein said operating antenna pattern is omni-directional when said speed of said mobile station exceeds a high speed threshold.

* * * * *